United States Patent [19]
Minato et al.

[11] Patent Number: 5,251,429
[45] Date of Patent: Oct. 12, 1993

[54] LAWN MOWER

[75] Inventors: Kazuhiro Minato, Dublin; Kazunobu Sato, Columbus, both of Ohio

[73] Assignee: Honda Giken Kogyo Kabushiki Kaisha, Tokyo, Japan

[21] Appl. No.: 819,240

[22] Filed: Jan. 13, 1992

[51] Int. Cl.⁵ .......................................... A01D 34/68
[52] U.S. Cl. .................................. 56/17.2; 56/17.5; 56/DIG. 18; 180/19.1
[58] Field of Search ...................... 56/17.2, 16.9, 17.1, 56/17.5, 11.2, 11.8, DIG. 6, DIG. 18; 180/19.1, 19.3

[56] References Cited
U.S. PATENT DOCUMENTS

| | | | |
|---|---|---|---|
| 4,678,042 | 7/1987 | Barton et al. ..................... | 56/17.1 X |
| 4,905,463 | 3/1990 | Eilles ................................. | 56/17.2 |
| 4,991,382 | 2/1991 | Scag ................................. | 56/11.2 X |
| 5,020,308 | 6/1991 | Braun et al. ................. | 56/DIG. 6 X |
| 5,138,824 | 8/1992 | Oshima et al. ................... | 56/16.9 X |
| 5,146,735 | 9/1992 | McDonner ....................... | 56/11.6 X |

Primary Examiner—Terry Lee Melius
Attorney, Agent, or Firm—Nikaido, Marmelstein, Murray & Oram

[57] ABSTRACT

A lawn mower comprising a frame, an engine mounted on the frame, and a cutting deck removably mounted on the frame. A wheel mounting structure is pivotally connected to the frame and rear wheels are mounted on the wheel mounting structure wherein the pivotal movement of the frame with respect to the wheel mounting structure raises and lowers the frame with respect to the wheels thereby raising and lowering the cutting deck. A lever mechanism is provided for pivoting the frame with respect to the wheel mounting structure to thereby raise and lower the frame with respect to the wheel mounting structure and a rod and plurality of holes are provided for fixing the position of the frame with respect to the wheel mounting structure at any of a plurality of predetermined positions. The lawn mower has hand controls for controlling a wheel driving system with a motor coupled to each wheel, in which a cover is provided for covering the linkage between the hand controls and the wheel driving system to protect the linkage from various hazards. Further, the front wheels of the lawn mower are positioned in an area in which the rotating blades cut from front to rear to thereby provide more even cut of the grass.

25 Claims, 8 Drawing Sheets

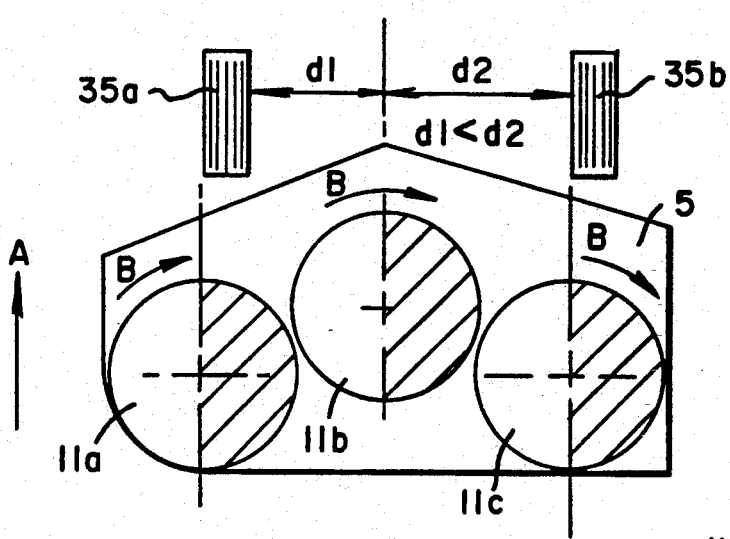
*FIG. 7A*
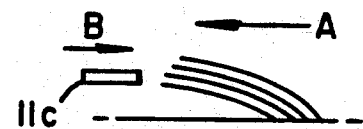
*FIG. 7B*
*FIG. 7C*
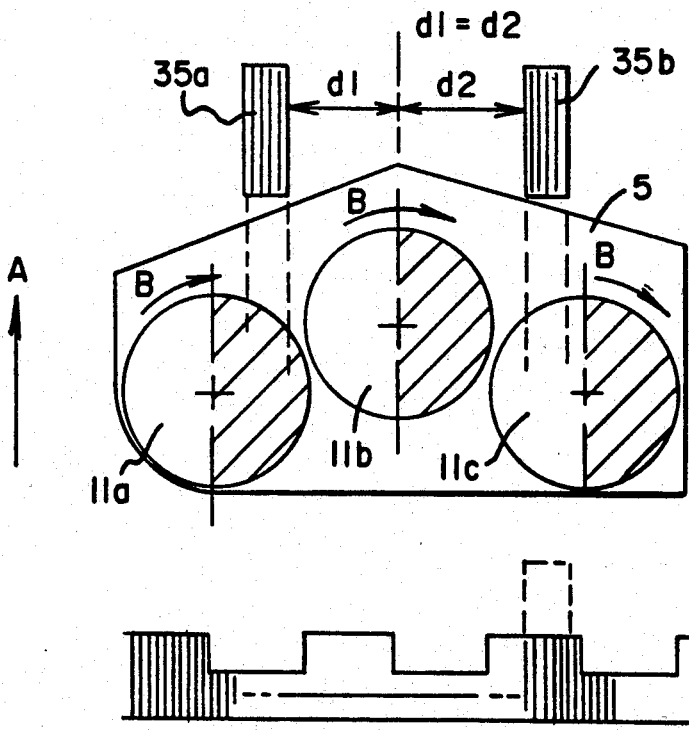
*FIG. 8A*
(PRIOR ART)
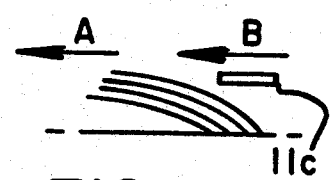
*FIG. 8B*
(PRIOR ART)
*FIG. 8C*

LAWN MOWER

BACKGROUND OF THE INVENTION

1. Field of the Invention

The present invention is directed to a lawn mower, and more particularly, to a lawn mower in which the rear wheel mounting structure is pivotally connected to the lawn mower frame and in which a lever engaging apparatus is provided for raising and lowering the frame with respect to the wheels.

2. Description of the Prior Art

In prior art lawn mowers, the wheel mounting structure is bolted to the lawn mower frame, and in order to raise or lower the frame to thereby raise or lower the mower's cutting deck, it is necessary to remove the bolts and raise the frame with respect to the wheels and then re-bolt the frame to the wheel mounting structure. This arrangement makes it difficult to raise and lower the cutting height of the lawn mower, particularly when this structure is used on large commercial-type lawn mowers.

Another problem which occurs in commercial-type lawn mowers having a plurality of cutting blades, is that the front wheels push down the grass and then the cutting blade, as it rotates from rear to front, passes over the top of the bent grass and does not cut it. This results in the uneven cutting of the grass, leaving the grass longer in the areas that the wheels have travelled over.

In prior art commercial lawn mowers in which the rear drive wheels are independently driven by hydraulic motors associated with each rear wheel, the operation of the hydraulic motors and thus the drive wheels is controlled by hand controls located on the hand grips of the lawn mower. A linkage extends from the hand grips to the hydraulic motor structure. In the prior art mowers, the linkages are located towards the outer sides of the mowers and are exposed, and thus, are subject to be hit by bushes, shrubs and other structures which the lawn mower may come in contact with during a cutting operation.

SUMMARY OF THE INVENTION

It is the object of the present invention to provide a lawn mower in which the frame, on which the engine and wheel driving motor structure are mounted, is pivotally connected to the wheel mounting structure in order to facilitate the raising and lowering of the frame with respect to the rear wheels. The raising and lowering of the frame results in the raising and lowering of the mower's cutting deck and blades with respect to the ground.

It is another object of the present invention to provide a lever mechanism for pivoting the frame with respect to the wheel mounting structure such that the frame can be easily raised and lowered by a single person.

It is still another object of the present invention to enable the lawn mower frame to be raised and lowered with respect to the wheel mounting structure and to provide for the fixing of the relative position of these two components at a plurality of predetermined positions.

It is still another object of the present invention to provide a lawn mower having a linkage between the lawn wheel motor control levers mounted on the lawn mower hand grips, which extends to the wheel motor control system in which a protective cover is provided for protecting the linkage and the motor driving system from exterior hazards.

It is still another object of the present invention to provide a lawn mower in which the wheels are positioned with respect to the mower's rotating cutting blades such that the wheels are positioned in front of the cutting blades in an area where the blades will cut from front to rear, such that the grass in its bent over position is pulled up and engaged by the blade in order to cut the grass.

The present invention is directed to a lawn mower comprising a frame, an engine mounted on the frame, and a cutting deck connected mounted on the frame. A wheel mounting structure is pivotally connected to the frame and rear wheels are mounted on the wheel mounting structure wherein the pivotal movement of the frame with respect to the wheel mounting structure raises and lowers the frame with respect to the wheels thereby raising and lowering the cutting deck. A lever mechanism is provided for pivoting the frame with respect to the wheel mounting structure to thereby raise and lower the frame with respect to the wheel mounting structure and a rod and plurality of holes are provided for fixing the position of the frame with respect to the wheel mounting structure at any of a plurality of predetermined positions.

The present invention is further directed to a lawn mower having hand controls for controlling a wheel driving system with a motor coupled to each wheel, in which a cover is provided for covering the linkage between the hand controls and the wheel driving system to protect the linkage from various hazards.

The present invention is further directed to positioning the front wheels of the lawn mower in an area in which the rotating blades cut from front to rear to thereby provide more even cut of the grass.

DESCRIPTION OF THE DRAWINGS

FIGS. 7A–7C illustrate the position of the front wheels of the lawn mower of the present invention.

FIGS. 8A–8C illustrate the position of the front wheels in prior art lawn mowers.

DETAILED DESCRIPTION OF THE PREFERRED EMBODIMENT

Figure 1:
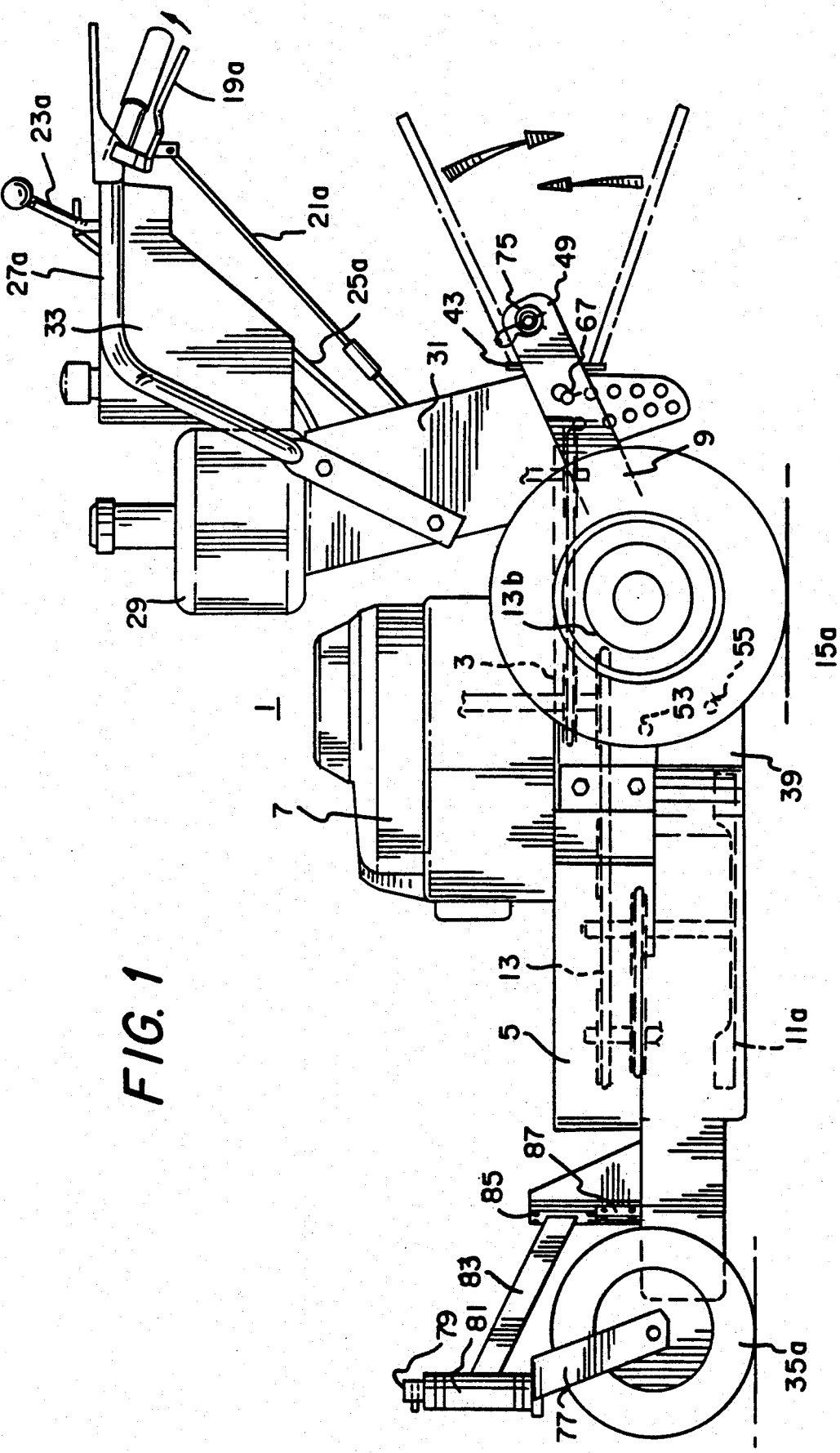
FIG. 1 is a side view of the preferred embodiment of a lawn mower of the present invention.
Figure 2:
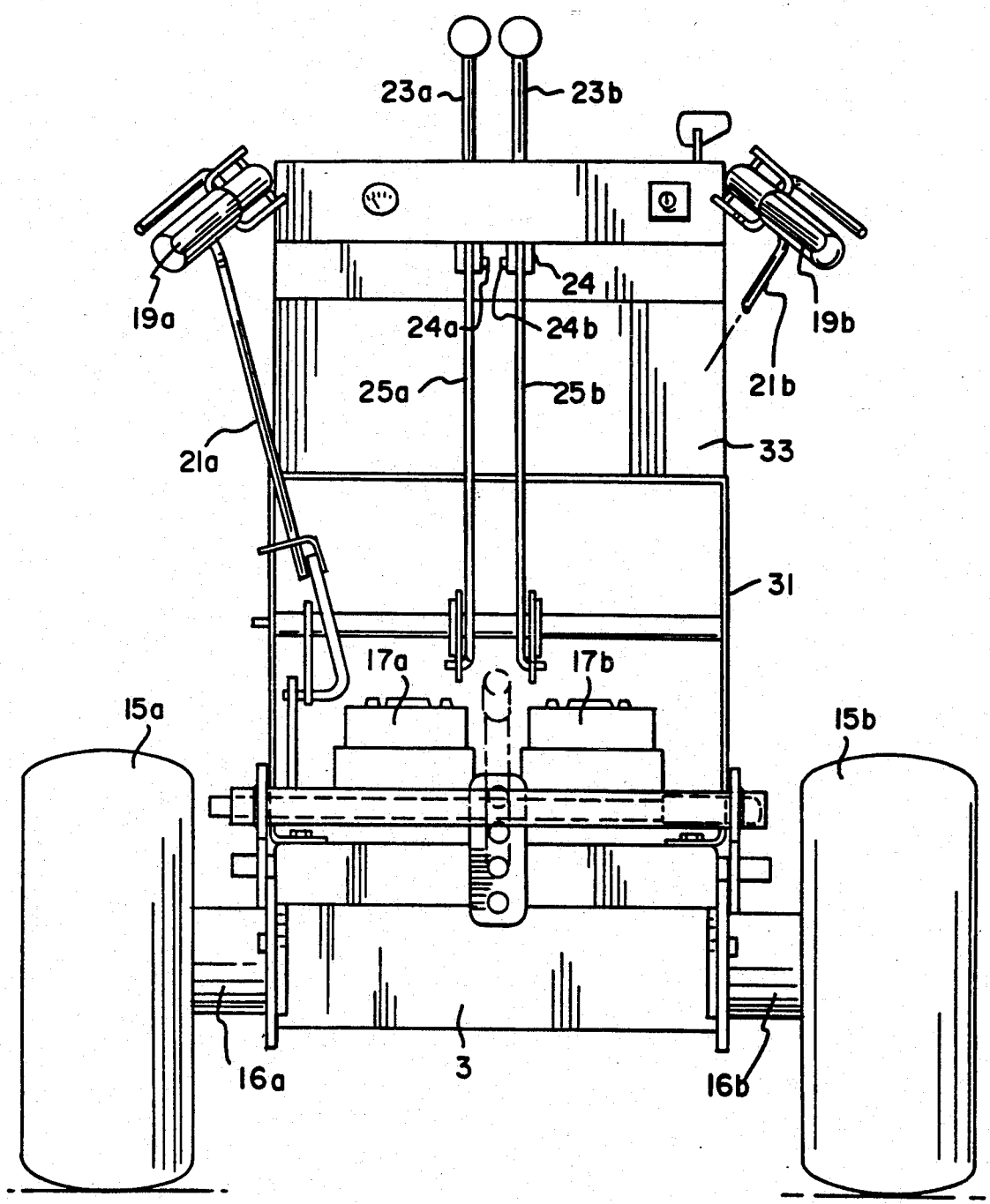
FIG. 2 is a rear view of the preferred embodiment of a lawn mower of the present invention.
Figure 3:
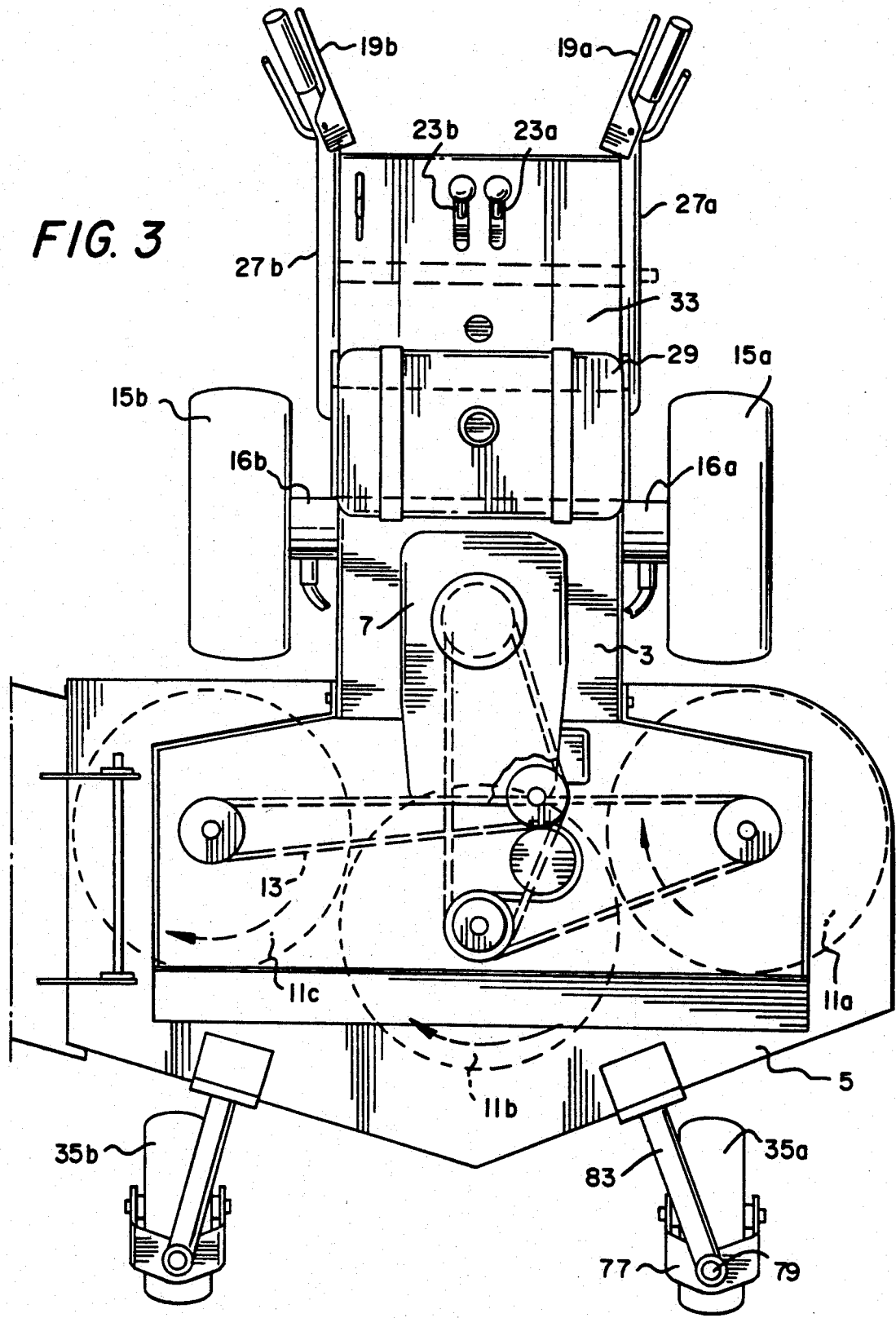
FIG. 3 is a top view of the preferred embodiment of a lawn mower of the present invention.
Figure 4:
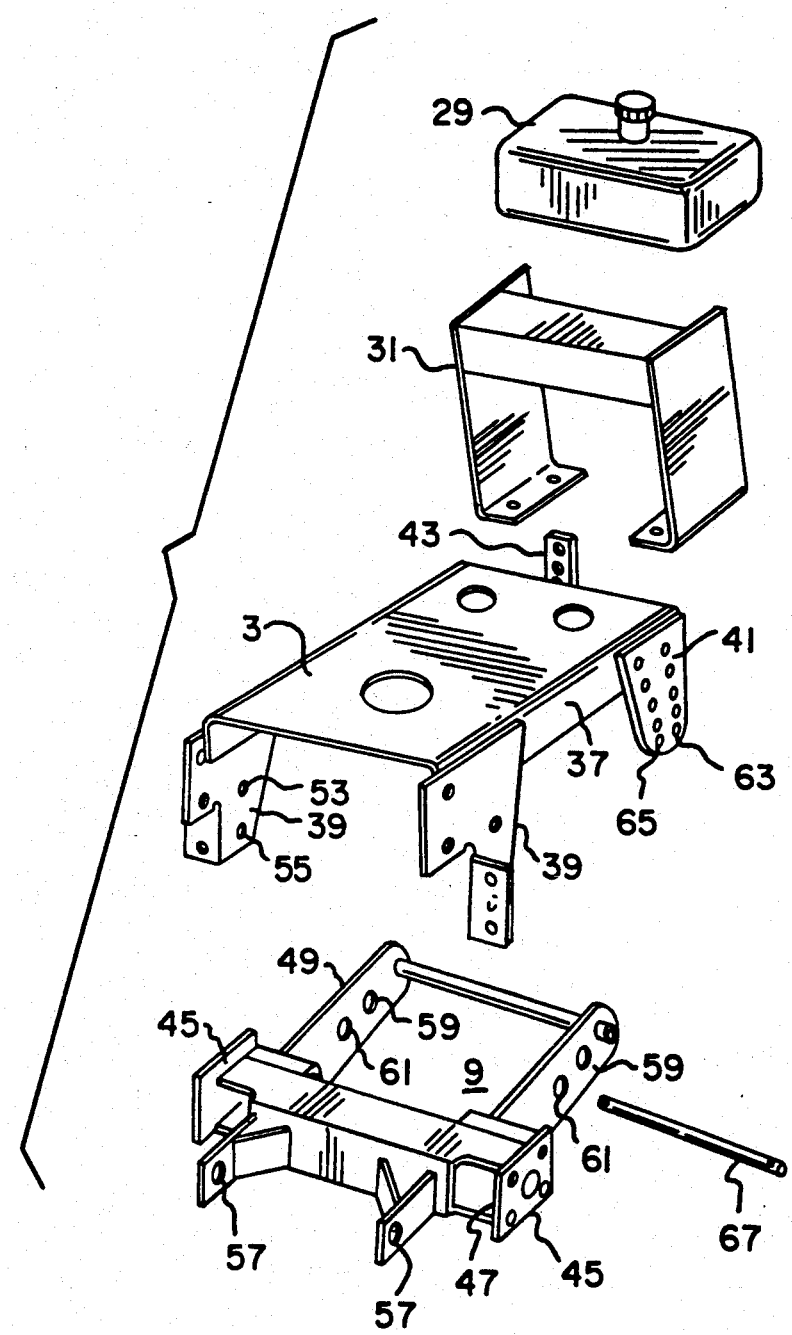
FIG. 4 is a partial exploded view of the preferred embodiment of the present invention.
Figure 5:
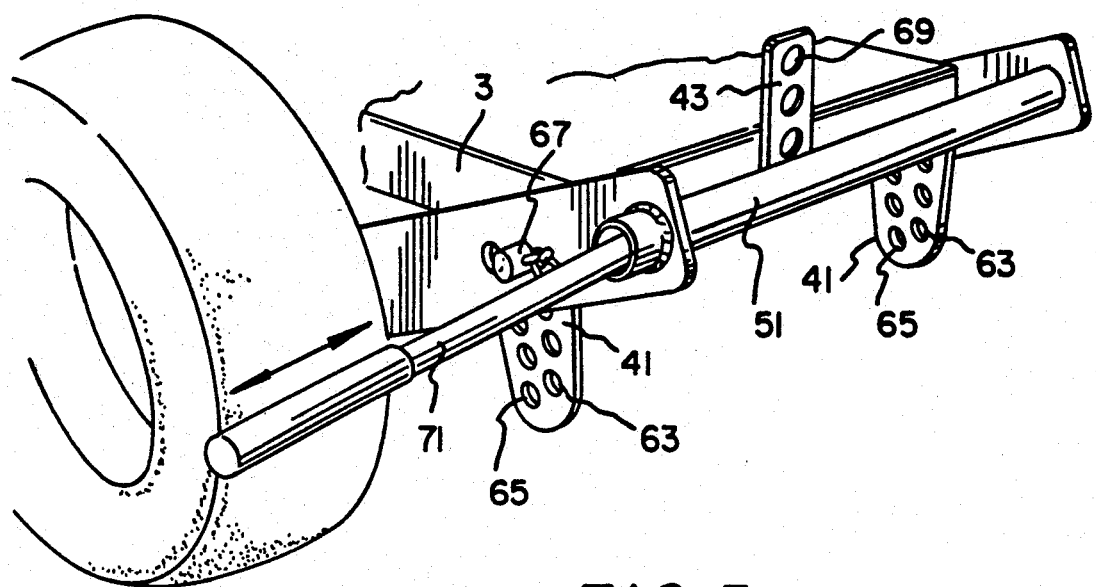
FIGS. 5 and 6 are partial rear perspective views of the lever and fixing structure of the present invention.
Figure 6:
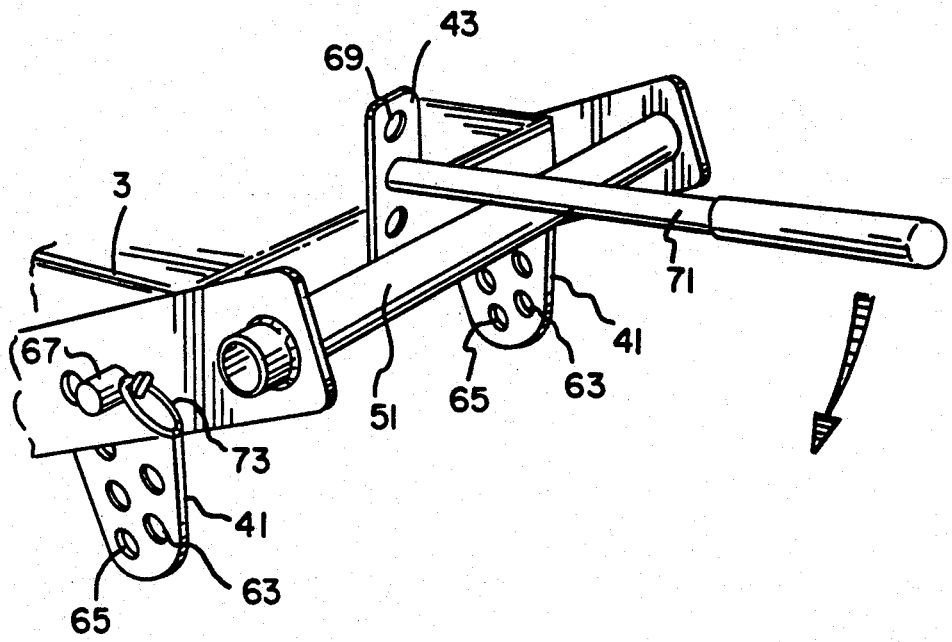

Referring to FIGS. 1 to 4, lawn mower 1 comprises a frame 3 with a cutting deck 5, an engine 7 and a wheel mounting structure 9 attached thereto. Cutting blades 11a, 11b and 11c are positioned within the cutting deck 5 and are connected to engine 7 by means of a belt and pulley structure 13a. Rear wheels 15a and 15b are positioned on opposite sides of the lawn mower and are the driving wheels for the lawn mower. The wheels 15a and 15b are independently driven by a hydraulic motor system which includes hydraulic pumps 17a and 17b driven by a belt and pulley structure 13b, and hydraulic motors 16a and 16b. Motors 16a and 16b are connected to pumps 17a and 17 by hoses 18a and 18b. The hydraulic motor system is controlled by means of hand grips 19a and 19b which are connected to the hydraulic pump swash plates through linkages 21a and 21b, and by master control levers 23a and 23b which are connected to the hydraulic pump swash plates through linkages 25a and 25b. The handles 19a and 19b are mounted on handle bars 27a and 27b. Master control levers 23a and 23b are used to set the maximum positions of movement of the swash plates of the hydraulic pumps 17a and 17b and thereby set the maximum speed of motors 16a and 16b, and thus the maximum speed of rotation of the drive wheels 15a and 15b. Master control levers 23a and 23b are operated independently of each other and thus the maximum speed of rotation of each wheel 15a and 15b can be separately set. Hand grips 19a and 19b control the position of the swash plates of the respective hydraulic pumps 17a and 17b within the maximum position set by the corresponding master control lever 23a and 23b. The hand grips 19a and 19b also control the direction of flow of hydraulic fluid through corresponding motors 16a and 16b, and thus control the direction of rotation of corresponding wheels 15a and 15b. The speed of each wheel 15a and 15b is controlled by moving the corresponding hand grips 19a and 19b toward the handle bars in the direction of the arrow shown in FIG. 1. The maximum speed in the forward direction is obtained when hand grip and handle bar are at maximum separation. As the hand grip is moved towards the handle bar, the speed of rotation of the corresponding wheel is decreased. At a predetermined point in the movement of the hand grip, the speed in the forward direction of the wheel is zero and this is a neutral position. Further, movement of the hand grip towards the handle bar causes the wheel to rotate in the reverse direction.

When operating the lawn mower, the operator can turn the lawn mower by causing wheels 15a and 15b to rotate at different speeds. This is done by independently operating each of the hand grips 19a and 19b. When the hand grips 19a and 19b are at their maximum separation from the handle bars, the speed of rotation of the wheels is set by the position of the master control levers 23a and 23b. Generally, the maximum speed of both wheels is set the same so that the lawn mower will move in a straight line at the maximum set speed. However, when the lawn mower is moving across a hill, if both wheels are rotating at the same speed, the lawn mower will tend to vary from a straight line and move downward on the hill side. In order to overcome this problem, the master levers 23a and 23b are operated independently, such that the maximum speed on the downhill wheel is greater than the maximum speed on the up hill wheel. This will enable the lawn mower to travel in a straight line without requiring the operator to continually adjust the speed using the hand grips 19a and 19b, thereby significantly simplifying operation.

The capability of independent operation of master control levers 23a and 23b provides the lawn mower operator with optimum speed control capability in that the operator can independently set the maximum speed of rotation of each wheel 15a and 15b, and then control the speed within the maximum speed by operation of the corresponding hand grips 19a and 19b. This enables the simplification and increases the safety of operation in situations such as operating on a hill side as described above, as well as in other situations where different maximum speeds of rotation are necessary and desirable.

A safety mechanism 24 is mounted on master control levers 23a and 23b. The safety mechanism comprises sensors 24a and 24b mounted on levers 23a and 23b respectively. A cut off switch 24c is operatively connected to sensor 24a and 24b and to the lawn mower engine, such that when sensors 24a and 24b are separated by more than a predetermined distance, the engine is stopped. The safety mechanism 24 thus prevents the lawn mower from extreme turns under the control of master levers 23a and 23b.

Figure 10A:
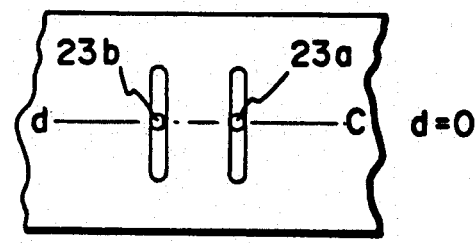
FIGS. 10A–10C illustrate the operation of the master control lever safety mechanism.
Figure 10B:
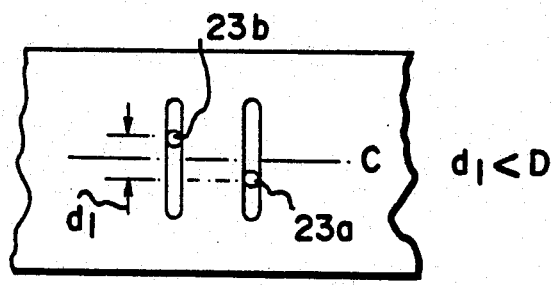
Figure 10C:
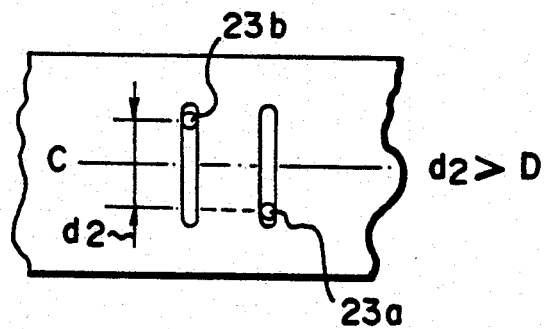

Referring to FIGS. 10A-10C, the control levers 23a and 23b can be moved independently about center line C. When the distance $d_1$ is greater than the predetermined distance D, the cut off switch 24c cuts off the lawn mower engine. The distance $d_1$ is sensed by the separation of the sensors 24a and 24b. FIG. 10A shows the levers 23a and 23b both positioned on center line C such that $d_1 = 0$. FIG. 10B shows the levers 23a and 23b separated by a distance $d_1$ which is less than D. FIG. 10C shows the levers 23a and 23b separated by a distance $d_1$ which is greater than D and thus switch 24c will cut off the engine to prevent extreme turns.

A fuel tank 29 is supported on hydraulic system cover member 31 and a hydraulic fluid storage tank 33 is supported by the handle bars 27a and 27b. Front wheels 35a and 35b are mounted on the front of cutting deck 5.

Frame 3 comprises a deck 37, front side plates 39 and rear side plates 41. The frame further includes an adjuster plate 43. Wheel mounting structure 9 includes wheel attaching portion 45, front mounting brackets 47 and arms 49 which extend rearwardly from wheel mounting portion 45. The motors 16a and 16b are positioned within the wheel mounting portion 45. The shafts of motors 16a and 16b are connected to the hubs 15c and 15d of the wheels 15a and 15b. A tube 51 extends between the two arms 49.

Wheel mounting structure 9 is pivotally connected to frame 3 by means of a bolt or pin which passes through either of holes 55 or 53 in the front side plates 39 and into holes 57 in brackets 47 on the wheel mounting structure. The selection of either hole 53 or hole 55 depends upon the height of the cut of the lawn mower. Hole 53 is used for lower cuts, and hole 55 is used for higher cuts. In addition, holes 59 and 61 in arms 49 are in alignment with a row of holes 63 and 65 respectively in rear side plates 41 in frame 3. A rod 67 is inserted through the aligned holes to fix the position of the wheel mounting structure 9 with respect to the frame 3. When holes 57 in brackets 47 are aligned with hole 53 in front side plate 53, holes 59 can be aligned with a selected one of the holes in row 63. Movement from one hole to an adjacent hole will raise or lower the frame 3 by one-half of an inch.

When holes 57 in brackets 47 are aligned with holes 55 in front side plates 39, holes 61 in arms 49 align with one of the holes in rows 65 of rear side plates 41. When this alignment is made, rod 67 is then placed through the aligned holes to fix the position of the frame 3 and wheel mounting structure 9. Moving holes 61 to adjacent holes in row 65 will raise or lower the frame 3 by one-half of an inch. Movement of holes 57 in brackets 47 from holes 53 to holes 55 will raise frame 3 by two inches.

In order to raise frame 3 with respect to wheel mounting structure 9 to thereby raise cutting deck 5 and thus the cutting height of the lawn mower, lever rod 71 is withdrawn from the center of tube 51 where it is stored during non-use. One end of lever rod 71 is placed in one of the holes 69 in adjuster plate 43. Rod 67 is then withdrawn from the aligned holes in arms 49 and rear side plates 41, and lever rod 71 is then used to raise or lower the rear of frame 3 about the pivot point formed by holes 57 in brackets 47 and one of the holes 53 or 55 in the front side plates 39 of the frame 3. In this way, one of the holes 63 or 65 is aligned with one of the holes 59 or 61 and then rod 67 is inserted into the aligned holes to fix the position of the rear of the frame 3 with respect to the arms 49 of the wheel mounting structure 9. A pin 73 can be used to hold the rod 67 in position. After the rod 67 has been inserted into the aligned holes, lever rod 71 can be removed and stored in the center of tube 51. A pin 75 can be used to hold the lever rod in its stored position.

Another aspect of the preferred embodiment of the present invention is the cove 31 which is mounted on the frame 3. As can be seen particularly in FIGS. 1 and 2, the linkages 21a and 21b, 25a and 25b, and hydraulic pumps 17a and 17b are all located at least at their lower portions within the cover 31. These elements are thus protected by cover 31 from damage from hazards such as bushes, shrubs, branches or other objects which may brush against or contact the lawn mower during operation. The cover 31 also provides support for the gasoline tank 29.

Referring to FIGS. 7A, 7B, 7C, 8A, 8B and 8C, it can be seen that the position of the front wheels 35a and 35b affect the height at which the grass is cut. As the lawn mower moves in the direction of arrow A, the blades 11a, 11b and 11c are rotating in direction of arrow B. In the prior art shown in FIGS. 8A-8C, the wheels 35a are positioned symmetrically with respect to the center line of the cutting blades such that distance d1=d2. As the wheels roll over the grass, they will bend the grass down, as shown in FIG. 8B. Blade 11c will cut the grass pushed down by wheel 35b from the rear, and will tend to pass over the top of the bent grass thus not cutting the grass as illustrated in FIG. 8C.

In the present invention however, wheels 35a and 35b are positioned such that the edges of the wheels are aligned with areas where the blades are moving in a direction B opposite to the direction of the movement of the lawn mower A. As can be seen in FIGS. 7A-7C, wheel 35b pushes down the grass but blade 11c is cutting in a direction opposite to the direction in which the grass has been pushed down, and thus blade 11c catches the top edges of the grass, picks the grass up and cuts it evenly rather than passing over the top of the grass as described with respect to the prior art in FIGS. 8A-8C.

Figure 9:
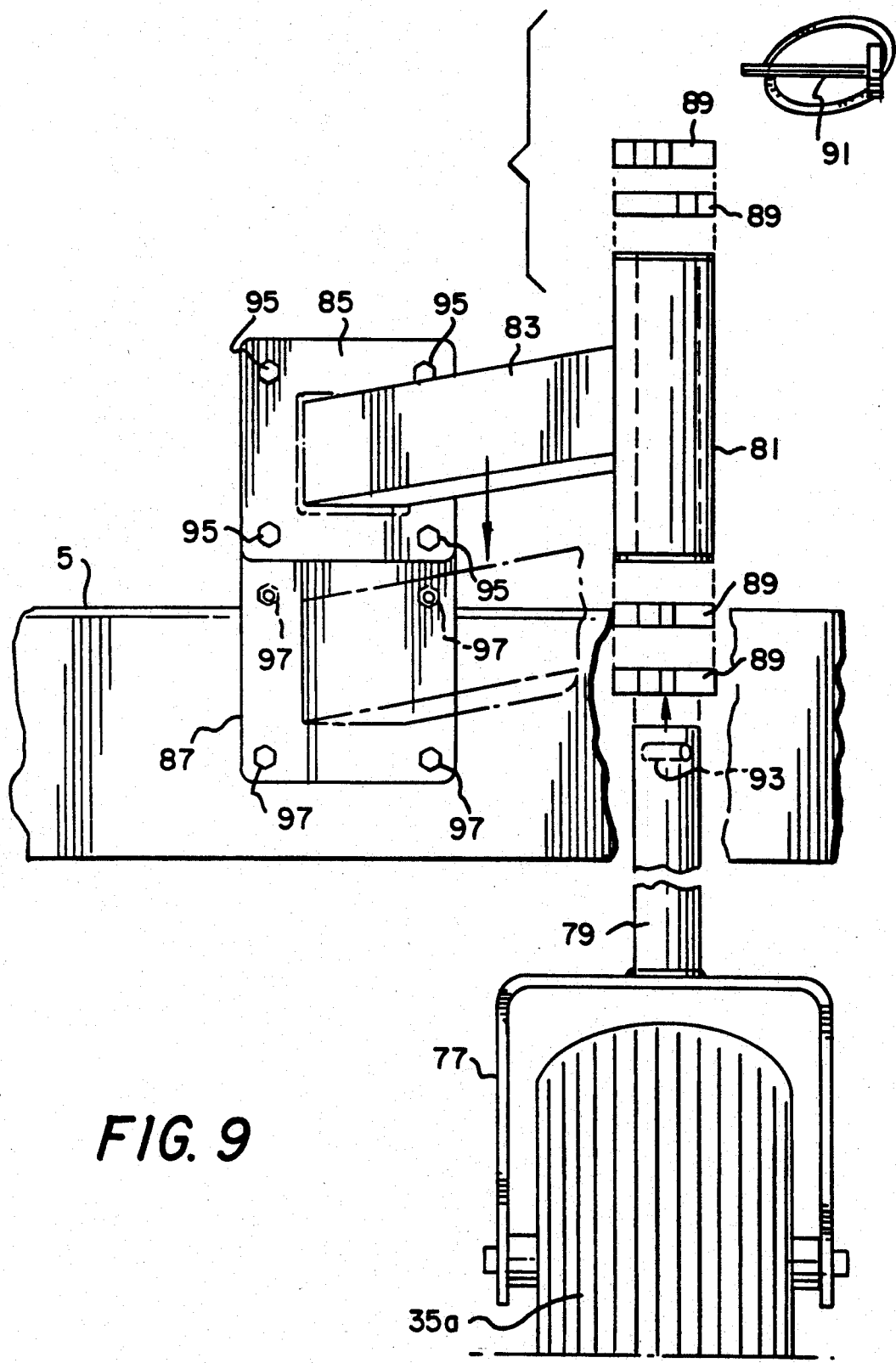
FIG. 9 illustrates the front wheel mounting structure in the preferred embodiment of the present invention.

Referring to FIG. 9, wheel 35 is mounted on a bracket 77 which is attached to a wheel mounting shaft 79. Wheel mounting shaft 79 is positioned in a tube 81 which is attached to arm 83, which is in turn attached to a mounting plate 85. The mounting plate 85 is bolted to a plate 87 on the front of cutting deck 5.

A plurality of shims 89 are used to adjust the height of mounting plate 85 with respect to the wheel 35a thereby adjusting the height of the cutting deck with respect to the wheel. In FIG. 9, two shims 89 are positioned between tube 81 and bracket 77. In order to raise the position of the mounting structure, one of the top shims 89 would be withdrawn from tube 81, and one of the upper shims 89 would be taken and placed between tube 81 and bracket 79 and the shaft 79 re-inserted into tube 81. In the inserted position, shaft 79 is held within tube 81 by means of pin 91 which passes through hole 93.

Larger changes of the height of the cutting deck 5 with respect to the wheel 35, can be made by changing the position of mounting plate 85 with respect to bracket plate 87. To do this, bolts 95 are removed and mounting plate 85 is positioned on the lower portion of bracket plate 87 and the bolts 95 are re-inserted in alignment with holes 97 in the bracket plate 87.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A lawn mower comprising:
   (a) a frame means;
   (b) an engine mounted on said frame means;
   (c) cutting deck means mounted on said frame means;
   (d) front wheels detachably mounted on said cutting deck means;
   (e) rear wheel mounting means pivotally connected to said frame means independent of said front wheels; and
   (f) rear wheels mounted on said rear wheel mounting means, wherein the pivotal movement of said rear wheel mounting means raises and lowers said frame means with respect to said rear wheels independent of said front wheels, thereby raising and lowering said cutting deck means.

2. A lawn mower as set forth in claim 1, wherein said wheel mounting means are detachably mounted on said frame means.

3. A lawn mower as set forth in claim 1, wherein said frame means includes a deck portion, front plate means extending downward from the front sides of said deck portion and rear plate means extending downward from the rear sides of said deck portion, wherein said wheel mounting means is pivotally connected to said front plate means and said wheel mounting means is adjustably fixed to said rear plate means.

4. A lawn mower as set forth in claim 3, wherein said wheel mounting means comprises a wheel mounting portion, said rear wheels being mounted on said wheel mounting portion, front bracket means for pivotally attaching said wheel mounting means to said front plate means; and arm means extending from said wheel mounting portion towards said rear plate means.

5. A lawn mower as set forth in claim 4, wherein said rear plate means includes at least one row of holes therein and wherein said arm means includes at least one hole therein, said at least one hole in said arm means being aligned with the row of holes in said rear plate means; said wheel mounting means including a first rod means extending through said at least one hole in said arm means and one of the holes in said at least one row of holes to thereby fix said arm means and said rear plate means thereby fixing the height of said wheel mounting means with respect to said frame means.

6. A lawn mower as set forth in claim 5, wherein said at least one row of holes is two rows of holes horizontally and vertically displaced with respect to one another, and wherein said at least one hole in said arm means is at least two holes, each hole being positioned for alignment with one of said rows of holes in said rear plate means.

7. A lawn mower as set forth in claim 6, wherein said front plate means includes two holes vertically displaced from each other and wherein said front plate means can be pivotally attached to said front bracket means in either of said two holes to thereby adjust the height of said wheel mounting means with respect to said frame means.

8. A lawn mower as set forth in claim 5, wherein said frame means includes an adjuster plate means having a least one hole therein, mounted on the rear of said deck portion, and wherein said wheel mounting means includes tube means extending between said arm means and lever means wherein one end of said lever means is inserted into said hole in said adjuster plate means such that a portion of the lever means rests on said tube means thereby enabling said lever means to function as a lever for raising or lowering said adjuster plate means and thereby change the height of said frame means with respect to said wheel mounting means.

9. A lawn mower as set forth in claim 8, wherein the center of said tube means is hollow for storing said lever means therein.

10. A lawn mower as set forth in claim 1, including rear wheel driving pump means mounted on said frame means, hand control means for controlling the operation of said rear wheel driving pump means, linkage means linking said hand control means and said rear wheel driving pump means, and cover means, mounted on said frame means, wherein said rear wheel driving pump means and at least as portion of said linkage means are positioned within said cover means.

11. A lawn mower as set forth in claim 10, wherein said cover means comprises two side plates and a top plate extending therebetween wherein said top plate extends in a transverse direction over substantially the entire width of said frame means.

12. A lawn mower as set forth in claim 10, wherein said two side plates and said top plate are integral.

13. A lawn mower as set forth in claim 11, including a fluid storage tank, said fluid storage tank being mounted on said top plate.

14. A lawn mower as set forth in claim 1, including a pair of front wheel means mounted on said cutting deck.

15. A lawn mower as set forth in claim 14, wherein said lawn mower includes at least two rotating cutting blades such that when rotating a first portion of each blade cuts in the forward direction during a portion of a single revolution and a second portion of each blade cuts in the rearward direction during the same portion of a single revolution, and wherein one of said front wheel means are aligned with each of said second portions of sad blades during the portion of a single revolution.

16. A lawn mower as set forth in claim 14, wherein each said front wheel means includes a mounting plate having holes therein, for connecting said wheel means to said cutting deck, and wherein said cutting deck includes at least two sets of holes corresponding to said holes in said mounting plate, such that the height of said cutting deck with respect to said front wheel means is adjustable by connecting said mounting plates to said cutting deck by positioning said holes in said mounting bracket in alignment with a selected one of said sets of holes in said cutting deck.

17. A lawn mower as set forth in claim 16, wherein said front wheel means includes a wheel mounting shaft means for holding said wheel and extending perpendicular to the axis of said wheel and a connecting means for connecting said mounting shaft means to said mounting plate, said connecting means including a hollow tube and a plurality of shim means, wherein said wheel mounting shaft means is positioned within said hollow tube and said shim means are adapted to be positioned to adjust the height of said connecting means with respect to said wheel mounting shaft means and thereby to adjust the height of said cutting deck with respect to said wheel means.

18. A lawn mower comprising:
(a) a frame means;
(b) an engine mounted on said frame means;
(c) cutting deck means mounted on said frame means, said cutting deck means including at least two rotating cutting blades, such that when rotating, a first portion of each blade cuts in the forward direction during a portion of a single revolution and a second portion of each blade cuts in the rearward direction during the same portion of a single revolution;
(d) rear wheel means mounted on said frame means;
(e) a pair of front wheels mounted on said cutting deck, wherein each of said front wheels is aligned with a corresponding one of said second portions of said blades during the portion of a single revolution.

19. A lawn mower as set forth in claim 18, wherein each said front wheel means includes a mounting plate having holes therein, for connecting said wheel means to said cutting deck, and wherein said cutting deck includes at least two sets of holes corresponding to said holes in said mounting plate, such that the height of said cutting deck with respect to said front wheel means is adjustable by connecting said mounting plates to said cutting deck by positioning said holes in said mounting bracket in alignment with a selected one of said sets of holes in said cutting deck.

20. A lawn mower as set forth in claim 18, wherein said front wheel means includes a wheel mounting shaft means for holding said wheel and extending perpendicular to the axis of said wheel and a connecting means for connecting said mounting shaft means to said mounting plate, said connecting means including a hollow tube and a plurality of shim means, wherein said wheel mounting shaft means is positioned within said hollow tube and said shim means are adapted to be positioned to adjust the height of said connecting means with respect to said wheel mounting shaft means and thereby to adjust the height of said cutting deck with respect to said wheel means.

21. A lawn mower comprising:
(a) a frame means;
(b) an engine mounted on said frame means;
(c) cutting deck means mounted on said frame means;
(d) rear drive wheel means mounted on said frame means;
(e) motor means including hydraulic pump means mounted on said frame means for driving said rear drive wheel means;
(f) hand control means for controlling said motor means;

(g) linkage means for coupling said hand control means to said motor means;

(h) a fuel tank; and (i) cover means, mounted on said frame means, for covering at least a portion of said linkage means and for supporting said fuel tank, wherein said pump means and at least a portion of said linkage means are positioned within said cover means.

22. A lawn mower as set forth in claim 21, wherein said cover means comprises two side plates and a top plate extending therebetween.

23. A lawn mower as set forth in claim 22, wherein said two side plates and said top plate are integral.

24. A lawn mower as set forth in claim 22, wherein said fluid storage tank is mounted on said top plate.

25. A lawn mower as set forth in claim 10, wherein said hand control means includes safety means for stopping said engine when said hand control means are positioned in an extreme position.

* * * * *